United States Patent
Ishigami et al.

(10) Patent No.: US 7,336,297 B2
(45) Date of Patent: Feb. 26, 2008

(54) CAMERA-LINKED SURVEILLANCE SYSTEM

(75) Inventors: Tomohide Ishigami, Tokyo (JP); Kensuke Maruya, Kawasaki (JP); Susumu Okada, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 190 days.

(21) Appl. No.: 10/828,499

(22) Filed: Apr. 21, 2004

(65) Prior Publication Data

US 2004/0263625 A1    Dec. 30, 2004

(30) Foreign Application Priority Data

Apr. 22, 2003 (JP) ............... P2003-117459
Mar. 31, 2004 (JP) ............... P2004-107067

(51) Int. Cl.
*H04N 7/18* (2006.01)

(52) U.S. Cl. .......................... 348/143; 348/153
(58) Field of Classification Search ......... 348/142–161
See application file for complete search history.

(56) References Cited

U.S. PATENT DOCUMENTS

| 5,164,827 A | * | 11/1992 | Paff | 348/143 |
| 5,666,157 A | * | 9/1997 | Aviv | 348/152 |
| 6,386,325 B1 | | 5/2002 | Fujita | |

FOREIGN PATENT DOCUMENTS

| JP | 08-054667 | 2/1996 |
| JP | 11-69432 | 3/1999 |
| JP | 2000/117708 | 4/2000 |

* cited by examiner

*Primary Examiner*—Anand Rao
(74) *Attorney, Agent, or Firm*—Browdy and Neimark, PLLC

(57) ABSTRACT

The surveillance system is configured of multi-camera including rotating cameras controllable for panning, tilting and zooming in and out, intruding object recognizing means for processing image signals from the rotating cameras and keeping track of a position of the intruding object, camera function determining means for allocating a tracking function to a first camera whose field of view is in a predetermined direction of the object of monitoring according to a state of the object of monitoring and allocating a wide angle shooting function for shooting a monitored space in a wide angle to a second camera, and camera control means for controlling the multi-camera according to actions of the camera function determining means.

13 Claims, 14 Drawing Sheets

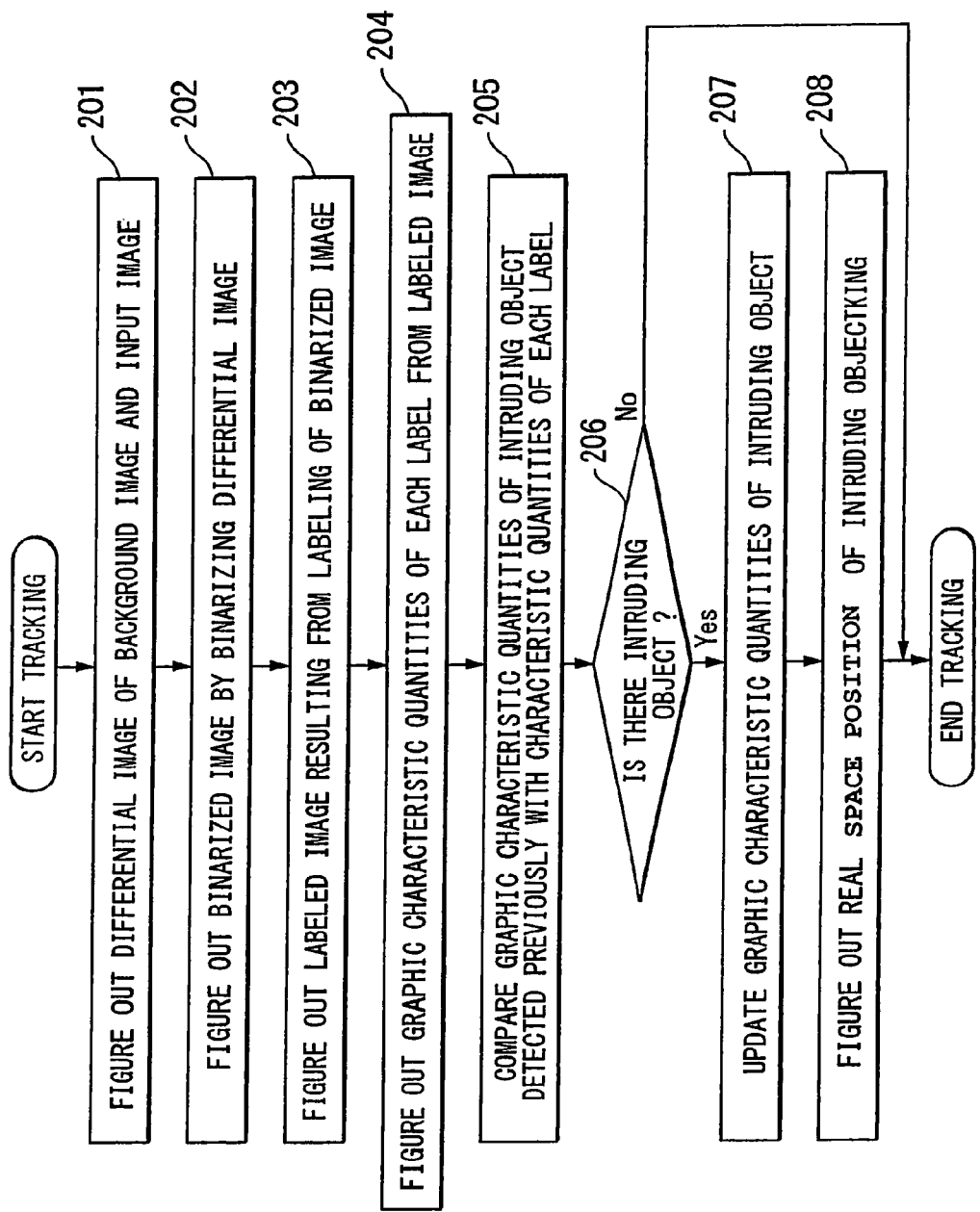

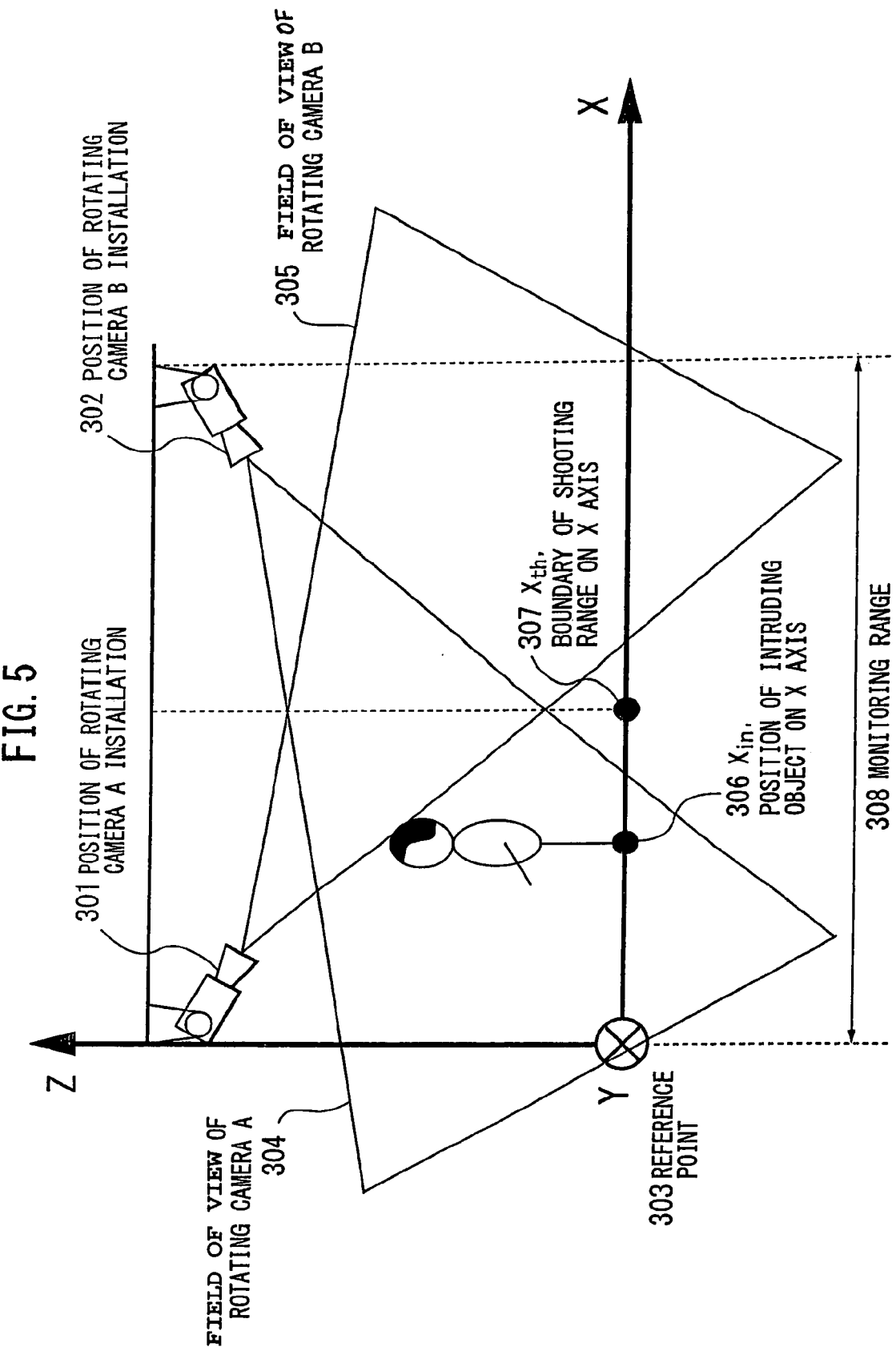

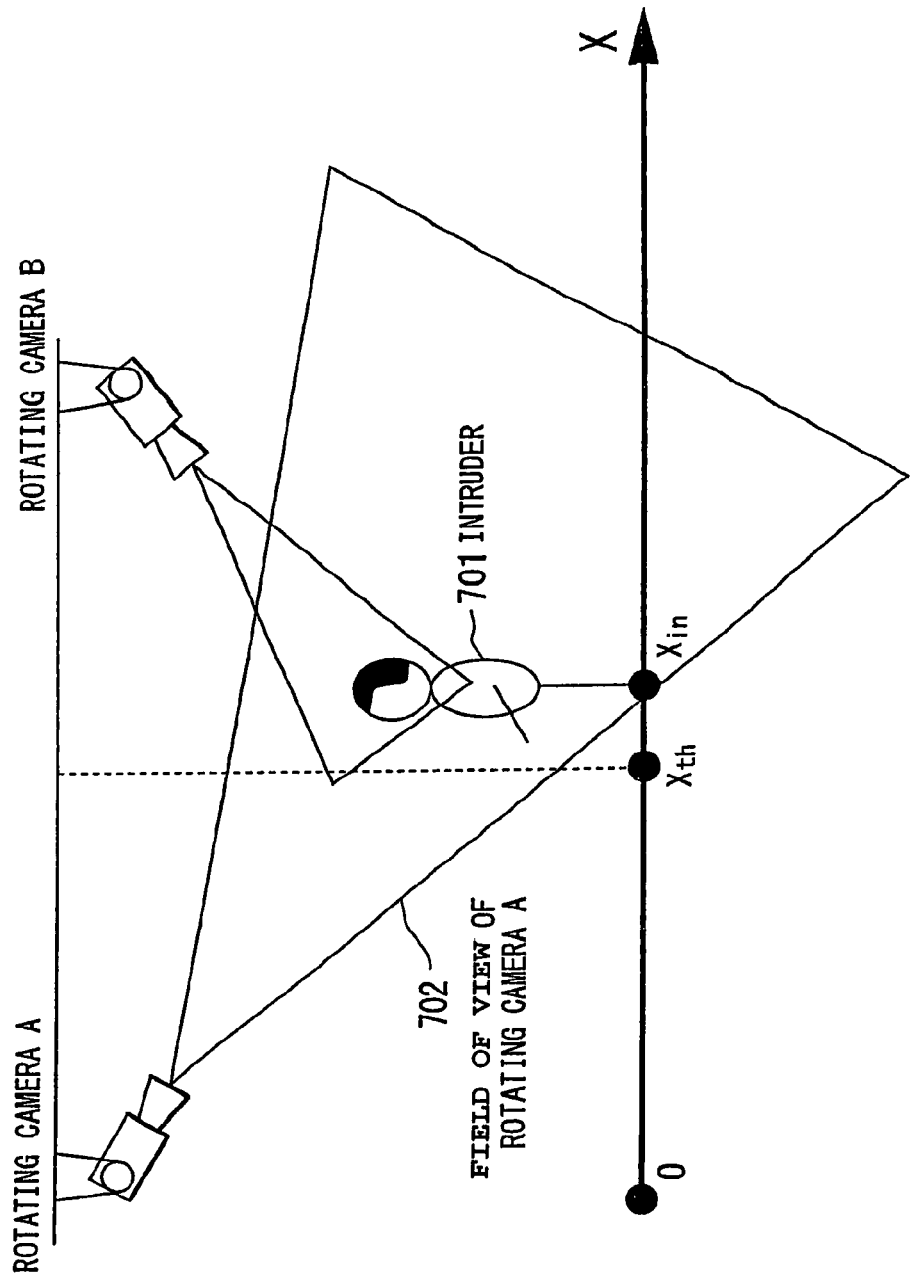

CAMERA-LINKED SURVEILLANCE SYSTEM

BACKGROUND OF THE INVENTION

1. Field of the Invention

The present invention relates to a surveillance system for automatically detecting an intruding object by using multi surveillance cameras and an image processing device, and displaying its enlarged image on a screen.

2. Description of Prior Art

In the field of surveillance equipment in recent years, there have emerged systems which not only display on a screen video signals supplied from cameras but also identify the position of any abnormality that has occurred by analyzing the signals with an image processing device, and presenting images of vicinities of the abnormality to the monitoring personnel.

An example of such prior art is described in the Japanese Patent Disclosure No. 69342/1999 (Patent Reference 1). The Patent Reference 1 discloses an intruding object tracking image processing system which, in order to detect an intruding object, uses a camera having a wide angle lens and displays an enlarged image of the intruding object on a screen by orienting toward the intruding object, identified by image processing, a rotating camera controllable for panning, tilting and zooming in and out.

This surveillance system according to Patent Reference 1 will be briefly described below with reference to FIG. 1. FIG. 1 is a block diagram showing the configuration of an intruding object tracking image processing system according to the prior art. This system comprises a wide angle shooting camera 1001 provided with a wide angle lens, a rotating camera 1002 which can be controlled in panning, tilting and zooming, an image processing device 1003 for analyzing image signals and supplying signals for controlling the rotating camera 1002 on the basis of the result of analysis, a monitor 1004 for displaying image signals from the wide angle shooting camera, and another monitor 1005 for displaying image signals from the rotating camera.

The wide angle shooting camera 1001, used for detecting an intruding object, supplies image signals to the image processing device 1003 and the monitor 1004. The rotating camera 1002, used for displaying the intruding object on an enlarged scale, is panned, tilted and/or zoomed in or out in accordance with control signals entered from the image processing device 1003, and supplies image signals to the monitor 1005. The image processing device 1003 comprises intruding object tracking means 1006 for keeping track of an intruding object and camera control means 1007 for generating control signals to be supplied to the rotating camera 1002. The intruding object tracking means 1006, utilizing image signals entered from the wide angle shooting camera 1001, detects, and identifies the position of, the intruding object by combining them with existing elements of image processing including background differences.

When the position of the intruding object has been identified, the camera control means 1007 generates a control signal which enables the rotating camera 1002 to shoot the intruding object in the orientation in which the intruding object is present in an appropriate size, and supplies the picked-up image to the rotating camera 1002. Upon receiving the control signal, the rotating camera 1002, in accordance with the control signal, rotates the camera in the orientation in which the intruding object is present and zooms in on the object for enlarged displaying. The monitor 1005, which displays image signals from the rotating camera 1002, displays an enlarged image of the intruding object.

However, whereas two cameras are used according to the above-cited example of the prior art, detection of an intruding object with a single wide angle shooting camera is inevitably susceptible to a blind spot, near the position in which the wide angle shooting camera is installed, in which the intruding object cannot be detected.

FIG. 2 is a schematic diagram illustrating the disadvantage of the above-cited example of the prior art. As shown here, if for instance a wide angle shooting camera 1102 is installed on a ceiling 1101 and any intruding object is to be shot from the ceiling 1101 in a looking-down position, an area 1103 immediately below the wide angle shooting camera 1102 will not be covered by the field of view 1104 of the wide angle shooting camera 1102 and become a blind spot in which no intruding object can be detected. Therefore, in order to detect an intruding object in the blind spot 1103, another wide angle shooting camera will have to be installed, entailing an expanded scale of hardware.

An object of the present invention, attempted in view of this disadvantage of the prior art, is to provide a surveillance system capable of displaying an enlarged image of an intruding object with no blind spot with the minimum number of cameras by operating multi-camera in coordination, including a rotating camera controllable for panning, tilting and zooming in and out.

SUMMARY OF THE INVENTION

In order to achieve the object stated above, there is provided according to the invention first a surveillance system equipped with multi-camera including a rotating camera controllable for panning, tilting and zooming in and out; intruding object recognizing means for recognizing a state of an object of monitoring by analyzing image signals entered from the multi-camera; camera function determining means for allocating, according to a situation of the object of monitoring, to a first camera a tracking function whose field of view is a predetermined direction of the object of monitoring and to a second camera a wide angle shooting function of shooting a monitored space in a wide angle; and camera control means for controlling the multi-camera according to the allocation of functions by the camera function determining means.

This provides an advantage that an intruding object can be kept track of with no blind spot with the minimum number of cameras by switching the role of detecting the object of monitoring from one camera to another according to the predetermined direction of the object of monitoring.

Second, there is provided a surveillance system including image accumulating means for accumulating images of the object of monitoring in advance and image recognizing means for comparing the accumulated images of the object of monitoring with an image of the object of monitoring entered from the first camera, wherein the camera function determining means allocate to a third camera a tracking function according to a result of comparison by the image recognizing means and a situation of the object of monitoring.

This makes it possible to choose a camera for keeping track of and shooting the object of monitoring according to its state, and thereby provides an advantage that an intruder can be kept track of as he or she moves.

Third, the camera function determining means choose a camera whose field of view is in the predetermined direction of the object of monitoring, allocate a tracking/shooting function to the cameras in a preferential order with priority assigned to the camera nearest to or farthest from the object of monitoring, and further allocates a wide angle shooting function.

This provides an advantage of making it possible to keep track of the object of monitoring in more detail when the tracking/shooting function is allocated to the cameras in a preferential order with priority assigned to the camera nearest the object of monitoring, or to allow no blind spot to occur but to catch the object of monitoring without fail, followed by stepwise or stepless tracking/shooting of the object of monitoring in more detail, when the tracking/shooting function and the wide angle shooting function are allocated to the cameras in a preferential order with priority assigned to the camera farthest from the object of monitoring.

Fourth, the camera function determining means recognize the states of the multi-camera and of the object of monitoring, and allocate the tracking/shooting function or the wide angle shooting function to the cameras according to these states.

This provides an advantage of appropriately allocating the role of picking up enlarged images and that of detecting the object of monitoring according to the states of the cameras and of the object of monitoring.

Fifth, the camera function determining means, when any camera is added or removed or any camera is in trouble, update memorized states of the multi-camera.

This provides an advantage of making always recognizable the removal of any camera or the inoperable state of any camera due to trouble.

Sixth, the camera function determining means memorize a state of a monitored area, and allocate the tracking/shooting function or the wide angle shooting function to the cameras according to the state of the monitored area and the situation of the object of monitoring.

This provides an advantage of making it possible to allocate the tracking/shooting function or the wide angle shooting function according to the state of the monitored area and the situation of the object of monitoring.

Seventh, the surveillance system is equipped with camera function determining means which allocate the functions of cameras by utilizing information on any obstacle in the monitored area.

This provides an advantage of enabling other cameras than the one prevented by an obstacle from shooting to operate in coordination to show the intruding object on an enlarged scale.

As hitherto described, according to the present invention, the presence of the plurality of rotating cameras capable of panning, tilting and zooming in and out and the camera function determining means for determining the role of each camera can provide the advantages of eliminating the blind spot which any single camera inevitably has and enabling the minimum number of cameras to display on an enlarged scale with no blind spot the intruding object, which is the object of monitoring.

Furthermore, the presence of the image accumulating means and the image recognizing means and the allocation of the tracking function to the third camera according to the result of comparison by the image recognizing means and the situation of the object of monitoring make it possible to appropriately choose the camera for tracking/shooting according to the situation of the object of monitoring and to keep track of any intruder as he or she moves.

Also, the presence of means to recognize the states of the cameras and of the object of monitoring and to determine the function of each camera according to the states provides the advantage that, even if any camera runs into trouble, the role of detecting the object of monitoring or the like can be allocated to some other camera than the one in trouble to make possible continued monitoring.

Further, the presence of means to determine the function of each camera by utilizing information on any obstacle in the monitored area to enable other cameras than the one prevented by the obstacle from shooting to operate in coordination to show the object of monitoring on an enlarged scale.

The adaptability to two or more cameras and the allocation of camera functions having the same effects to the multi-camera make it possible to display an enlarge image of the object of monitoring in more detail and to detect the position and the direction of the object of monitoring more accurately.

The presence of means to figure out the moving direction of the intruding object by using image processing and various sensors and determining the function of each camera according to the moving direction provides still another advantage that appropriate zooming can be accomplished to match the moving direction of the intruding object and to display the portion to be monitored, such as the front face of the intruder.

A similar advantage can also be realized by providing means which can recognize the direction of the intruding object and determines the function of each camera according to that direction.

The above-stated and other objects and advantages of the invention will become more apparent from the following description when taken in conjunction with the accompanying drawings.

BRIEF DESCRIPTION OF THE DRAWINGS

FIG. 4 is a flowchart of the sequence of processing to identify three-dimensional coordinates in the monitored space of the object of tracking from image signals in the first preferred embodiment of the invention;

FIG. 5 illustrates definition of the monitored space in the first embodiment of the invention;

FIG. 9 illustrates another case in which the camera function determining section determines the function of each camera in the first embodiment of the invention;

DESCRIPTION OF THE PREFERRED EMBODIMENTS

Preferred embodiments of the present invention will be described with reference to FIG. 3 through FIG. 14. The invention is not limited to these embodiments, but can be implemented in many different modes without deviating from its essentials.

Embodiment 1

FIG. 3 through FIG. 11 illustrate a first preferred embodiment of the invention. Regarding this embodiment, it will be described how universal heads supporting cameras pan and tilt, and how two rotating cameras whose lenses can be zoomed in and out are used to keep track of any intruder and display his or her enlarged image on a screen.

Figure 1:
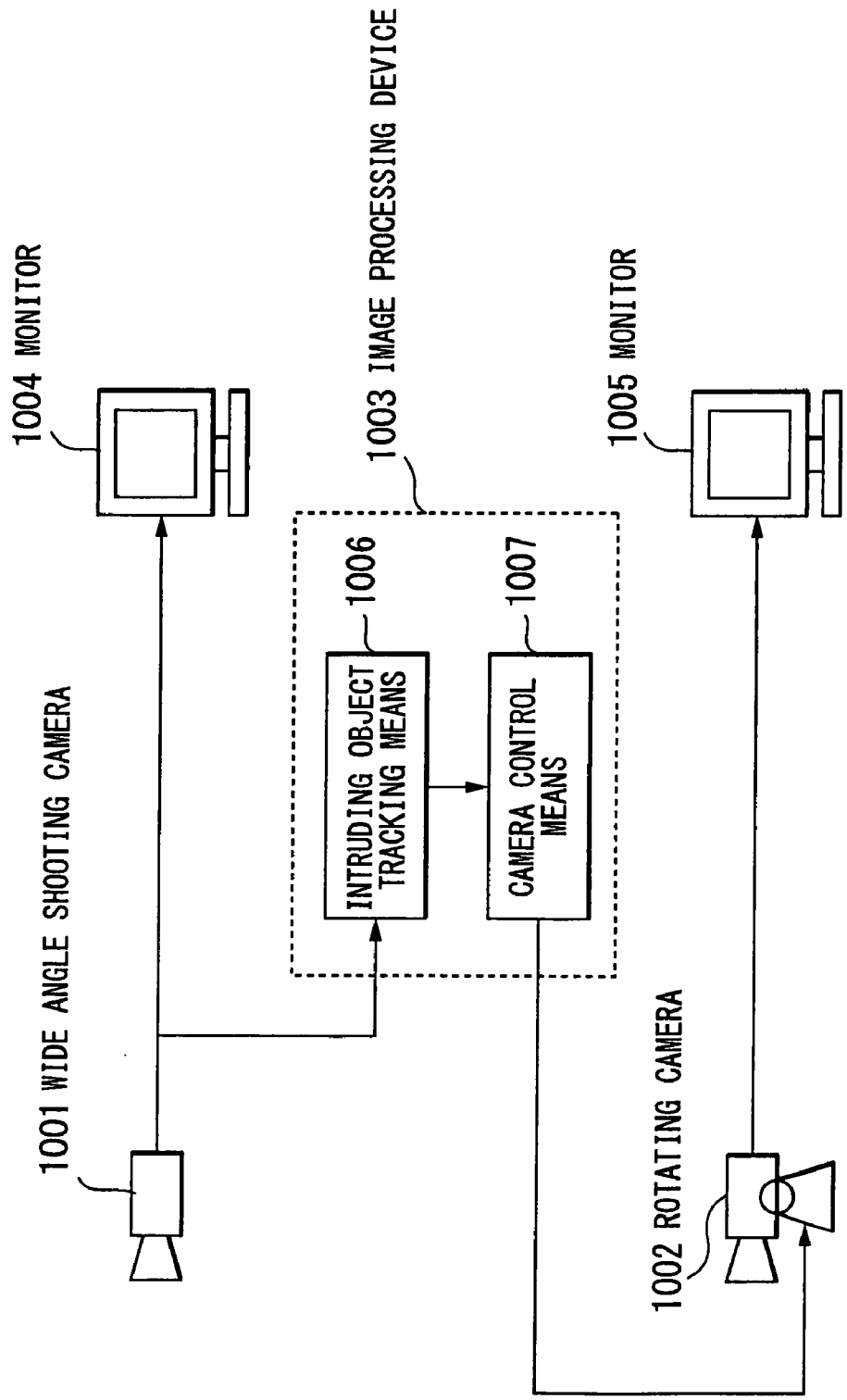
FIG. 1 is a block diagram showing the configuration of an intruding object tracking image processing system according to the prior art.
Figure 2:
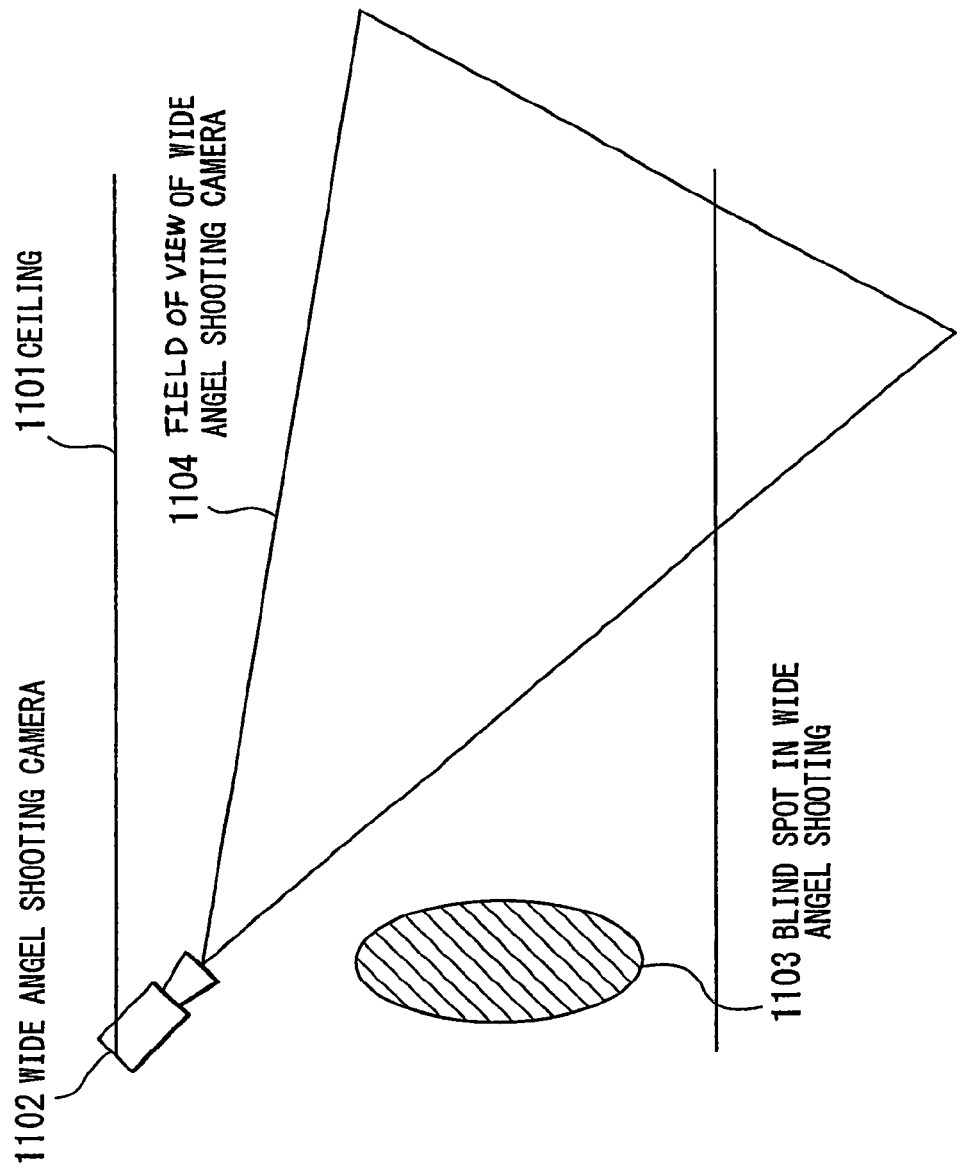
FIG. 2 is a schematic diagram illustrating the disadvantage of the prior art.
Figure 3:
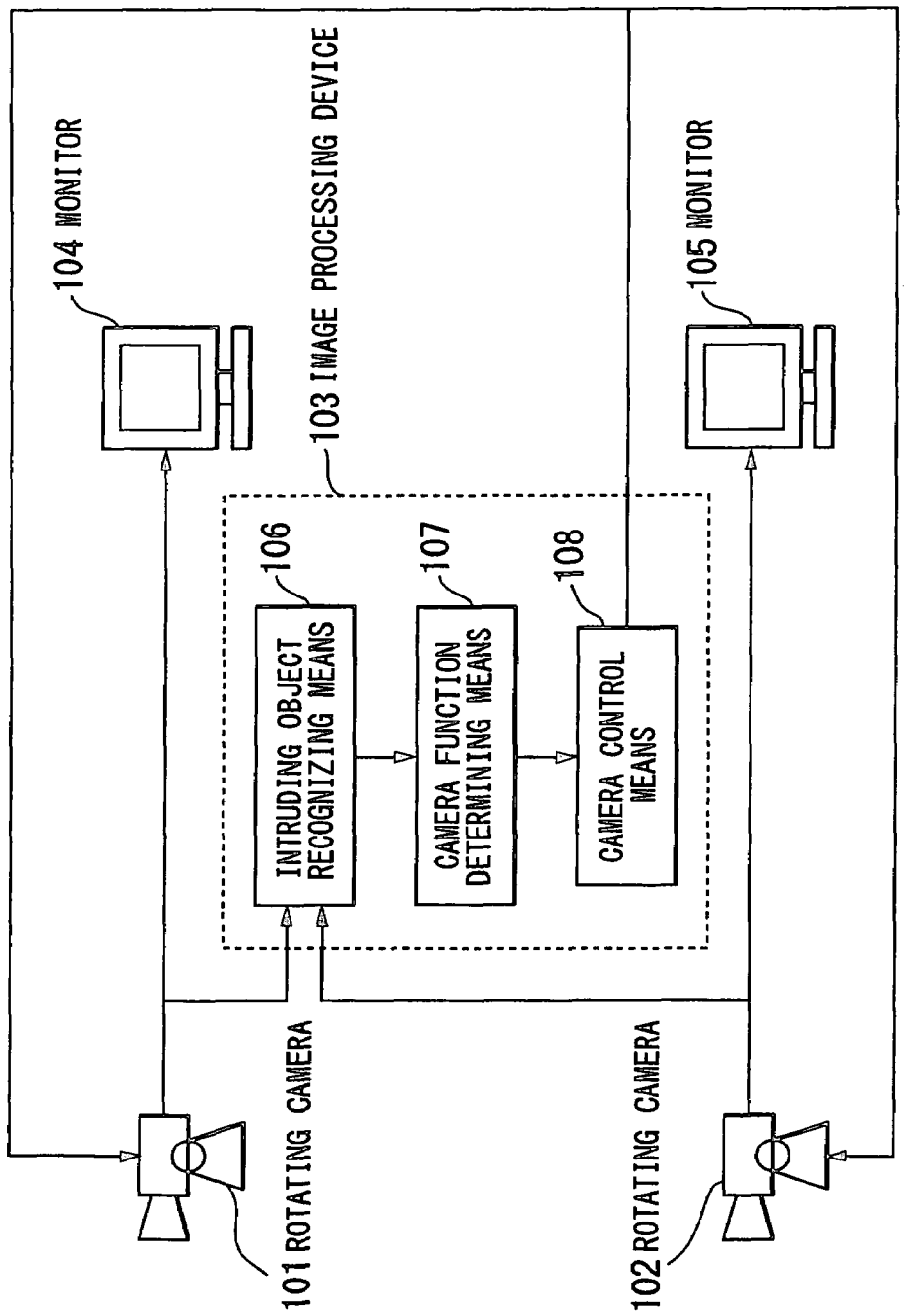
FIG. 3 is a block diagram of the configuration of a surveillance system, which is a first preferred embodiment of the invention.

FIG. 3 is a block diagram of the configuration of a surveillance system, which embodies the invention in this mode. This surveillance system comprises two rotating cameras 101 and 102 controllable for panning, tilting and zooming in and out with control signals, an image processing device 103 for processing image signals sent from the rotating cameras 101 and 102 and generating control signals for the rotating cameras 101 and 102 according to the result processing, and monitors 104 and 105 for displaying image signals sent from the rotating cameras 101 and 102 on their screens.

It is possible to allocate to each of the rotating cameras 101 and 102 one or the other of two functions, a tracking/shooting function and a wide angle shooting function. When the tracking/shooting function is allocated, the camera tilts and/or pans in accordance with a control signal generated by the image processing device 103, is turned in the intended direction, zooms in to shoot the object, and supplies image signals to the monitors 104 and 105. On the other hand, when the wide angle shooting function is allocated, the camera so zooms out as to shoot the whole monitored space, and supplies image signals to the monitors 104 and 105 and the image processing device 103.

The image processing device 103 comprises intruding object recognizing means 106 for identifying the position of any intruder, who is to be the object of monitoring; camera function determining means 107 for determining the function of each rotating camera according to the position of the intruder; and camera control means 108 for generating a control signal for each rotating camera according to its function.

The intruding object recognizing means 106 analyzes image signals sent from the rotating camera 101 or 102 to which the wide angle shooting function is assigned, and identifies the three-dimensional coordinates of the intruder in the monitored space. A three-dimensional coordinate system is set in advance in the monitored space, and the presence of the cameras in the common coordinate space facilitates the control of the cameras.

FIG. 4 is a flowchart of the sequence of processing to identify three-dimensional coordinates in the monitored space of the object of tracking from image signals. FIG. 5 illustrates definition of the monitored space in this embodiment of the invention. To enable processing charted in FIG. 4 to be executed, the monitored space is so set that, as shown in FIG. 5, the X axis and the Y axis are in parallel, and the Z axis is normal, to the floor; that the three axes are orthogonal to each other; that a rotating camera A is installed in position 301 above a reference point and a rotating camera B, in position 302 as high as the rotating camera A. Intermediate processing images on the way of finding out the three-dimensional coordinates on the monitored space from input images in figuring out the position of the intruding object, for instance, are shown in FIG. 6.

Referring to FIG. 4, at step 201, differential images representing only the variations in image are generated from images entered from the rotating cameras 101 and 102. A differential image is an image cleared of the background to represent a moving object including the intruding object. This image can be generated by, for instance, a method using three consecutive frames described in Tomoharu Nagao and Takeshi Agui, Computer Image Processing and Recognition, SHOKODO CO., LTD., pp. 162-163 (in Japanese). Such three consecutive frames are exemplified in FIG. 6(a).

At step 202, the variation in the differential image figured out at step 201 is subjected to binarization to represent the variation in 0 and 1 and thereby to find out a differential image. At step 203, the image having undergone the binarization is labeled as described in op. cit., pp. 67-68, and images bearing the same label are searched for in each cluster in the binary image.

Figure 6E:
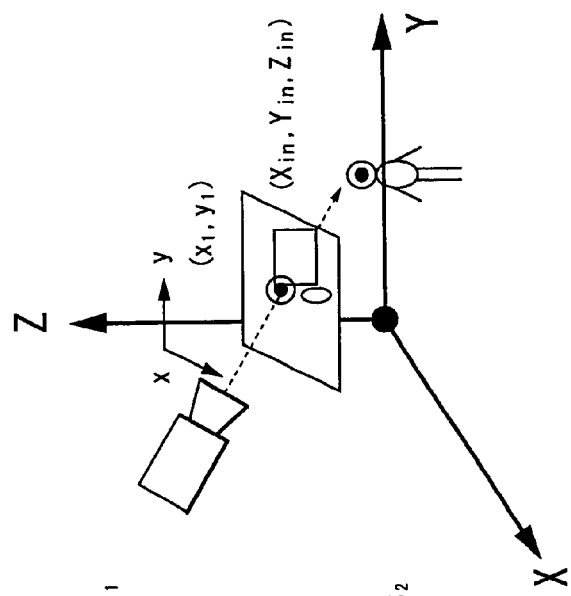
FIG. 6 shows intermediate processing images, in figuring out the position of the intruding object, from an input image to three-dimensional coordinates in the monitored space that are found out in the first embodiment of the invention.
Figures 6C, 6D:
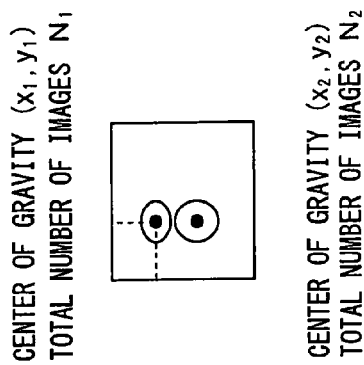
Figures 6A, 6B:
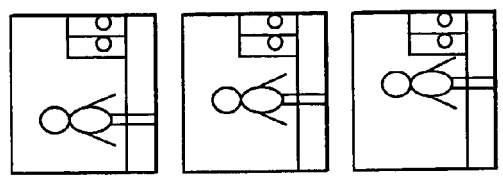

The binarization and labeling constitute pretreatment for extracting characteristic quantities, such as the position and size, of a candidate for the intruding object out of the differential image. Examples of binary image and labeled image are shown in FIGS. 6(b) and 6(c), respectively. At step 204, characteristic quantities on the image, such as the position of the center of gravity and the size, of each label in the labeled image found out at step 203 are figured out. By figuring out the characteristic quantities, it is decided whether or not the image shows an intruding object. An example showing characteristics of a cluster in an image is illustrated in FIG. 6(d).

At step 205, the memorized position of the center of gravity and size of the intruding object and the corresponding characteristic quantities of each label figured out at step 204 are compared with each other, and if similarity is found between them, it will be decided that there is an intruding object. At step 206, if it is decided at step 205 that an intruding object is present, the processing will go ahead to step 207; otherwise it is decided that there is no intruding object, this decision is made known to the camera function determining means 107, and the processing is ended. At step 207, the characteristic quantities of a label found similar to those of the intruding object at step 205 are updated as the characteristic quantities of the intruding object. At step 208, the position of the center of gravity of the intruding object, which is a characteristic quantity, on the image is converted into three-dimensional coordinates of the monitored space by using camera parameters of the rotating cameras 101 and 102 figured out in advance, and the coordinates are supplied to the camera function determining means 107.

The camera parameters are figured out and coordinates on an image picked up by a rotating camera are converted into coordinates on a monitored space by methods described in Kosuke Sato and Seiji Inokuchi, 3D Imaging Techniques for Measurement, SHOKODO CO., LTD., pp. 91-99 (in Japanese). The camera parameters are figured out by measuring six or more points of three-dimensional coordinates in the monitored space matching coordinates on the image picked up by the rotating camera. By using these parameters, coordinates in a three-dimensional space can be calculated from the coordinates of any given point on the image. The relationship between points on the screen and coordinates in a three-dimensional space are shown in FIG. 6(e).

Figure 7:
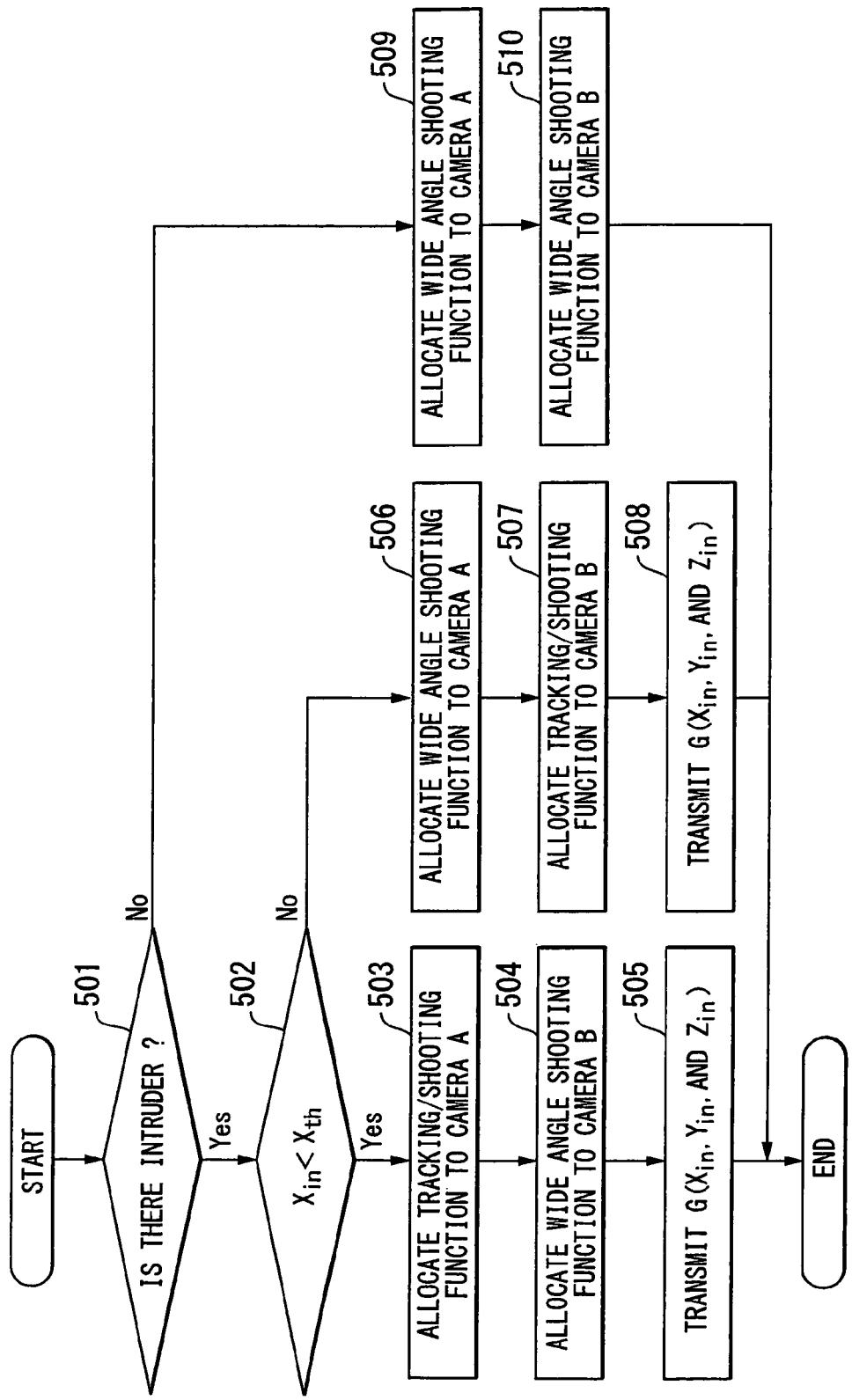
FIG. 7 is a flowchart of the sequence of processing in which a camera function determining section in the first embodiment of the invention allocates the function of each camera according to the three-dimensional position of the intruding object.

The camera function determining section 107 allocates to the rotating cameras 101 and 102 the wide angle shooting function for detecting an intruding object and the tracking/shooting function for displaying the intruding object on an enlarged scale according to the three-dimensional coordinates G ($X_{in}$, $Y_{in}$ and $Z_{in}$) in the monitored space for the intruder figured out by the intruding object recognizing means 106. The operation of the camera function determining section 107 to allocate camera functions on the basis of the three-dimensional position of the intruding object will now be described. FIG. 7 is a flowchart for explaining the camera function determining operation referred to above.

Referring to FIG. 7, at step 501, it is decided on the basis of information received from the intruding object recognizing means 106 whether or not there is an intruder and, if there is, the processing will go ahead to step 502 or, if not, to step 509. At step 502, $X_{in}$ 306, the value of the X component of the three-dimensional coordinates G ($X_{in}$, $Y_{in}$ and $Z_{in}$) in the monitored space of the intruder shown in FIG. 5, and $X_{th}$ 307, the boundary on the X axis between the field of view 304 of the rotating camera A and the field of view 305 of the rotating camera B on the monitored space are compared and, if $X_{in}$ is found smaller than $X_{th}$, the processing will go ahead to step 503 or otherwise to step 506.

Figure 8:
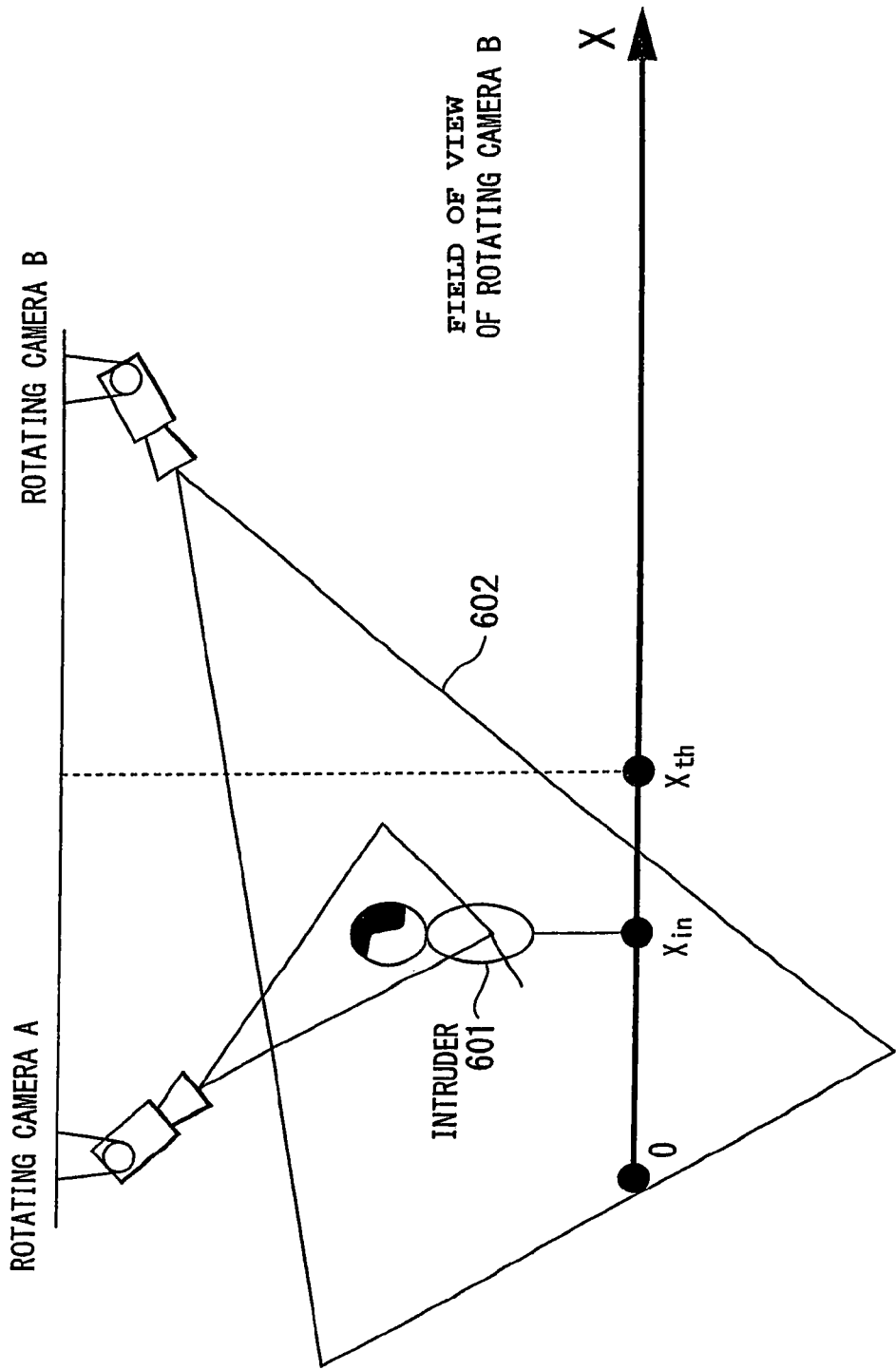
FIG. 8 illustrates a case in which the camera function determining section determines the function of each camera in the first embodiment of the invention.

At step 503, since an intruder 601 is present within a field of view 602 of the rotating camera B as shown in FIG. 8, the rotating camera A is determined to have the tracking/shooting function to display an enlarged image of the intruder on the screen, and at step 504 the rotating camera B is determined to have the wide angle shooting function to discover any intruder. Further at step 505, the three-dimensional coordinates G ($X_{in}$, $Y_{in}$ and $Z_{in}$) in the monitored space of the intruder is sent to the camera control means 108.

At step 506, since an intruder 701 is present within a field of view 702 of the rotating camera A as shown in FIG. 9, the rotating camera A is determined to have the wide angle shooting function to discover any intruder, and at step 507 the rotating camera B is determined to have the tracking/shooting function to display an enlarged image of the intruder on the screen. Further at step 508, the three-dimensional coordinates G ($X_{in}$, $Y_{in}$ and $Z_{in}$) in the monitored space of the intruder are sent to the camera control means 108.

At step 509, where there is no intruder present, the rotating camera A is determined to have the wide angle shooting function to discover any intruder in order to monitor any object intruding into a monitoring range 308 shown in FIG. 5, and at step 510 the rotating camera B is determined to have the wide angle shooting function to discover any intruder.

The camera control means 108 generates a camera control signal for the camera to which the tracking/shooting function is allocated to enable it to shoot the object of tracking in an appropriate size, and generates a camera control signal for the camera to which the wide angle shooting function is allocated to enable it to shoot the whole monitored space. The camera control signals are transmitted to the respective rotating cameras. The control signals can be generated by converting the three-dimensional coordinates (X, Y, Z) in the monitored space at the point desired to be shot into coordinates (α, β, γ) in a polar coordinate system having the camera to be controlled as its origin.

Of the polar coordinates (α, β, γ) resulting from the conversion, α is the panning angle, β is the tilting angle and γ is the zoom factor. On the basis of these values, respective differences (Δα, Δβ, Δγ) from the panning angle, tilting angle and zoom factor before the turning and zooming (α', β', γ') held within the camera are figured out, and control signals for the panning, tilting and zooming are generated according to the respective differences. For instance when the camera is given the tracking/shooting function, control signals are generated by substituting the coordinates of the point where shooting is desired for the three-dimensional coordinates G ($X_{in}$, $Y_{in}$ and $Z_{in}$) of the monitored space supplied from the camera function determining means.

FIG. 10 illustrates the motions of the rotating camera B from the time an intruder comes in from outside the monitored space, passes the monitored space and goes out of the monitored space again. An example of displaying an enlarged image of the intruding object by using the two rotating cameras A and B, neither having a blind spot, will be described below with reference to FIG. 10.

Figure 10A:
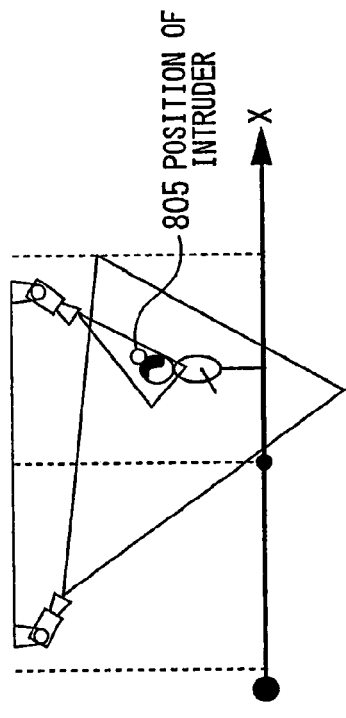
FIG. 10 illustrates the camera functions in the first embodiment of the invention by following the motions of a rotating camera A and a rotating camera B from the time an intruder comes in from outside the monitored space, passes the monitored space and goes out of the monitored space again.
Figure 10B:
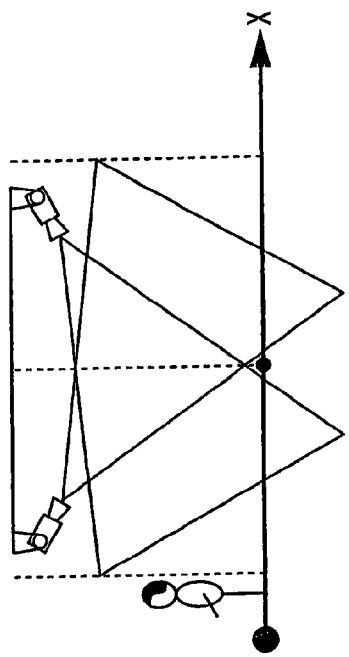

In FIG. 10(a), showing a state in which an intruder 801 is outside the monitored space, both the rotating cameras A and B are shooting in wide angles to detect any intruder, mutually covering each other's blind spot. This state is defined to be an initial wide angle shooting state. Referring to FIG. 10(b) showing a state in which the intruder 801 has moved and invaded into a field of view 803 of the rotating camera A in the initial shooting state, the rotating camera A has caught the intruder 801 and sends his or her image to the image processing device 103. The image processing device 103 processes the image entered from the rotating camera A, and sends a control signal to the rotating camera B to direct the rotating camera B toward coordinates 805 of the intruder 801 on the monitored space to take an enlarged shot. The rotating camera B, receiving the control signal, can display on a monitor an enlarged image of a watcher by being turned to, zoomed in on and shooting the vicinity of 805, where the watcher is present.

Figure 10C:
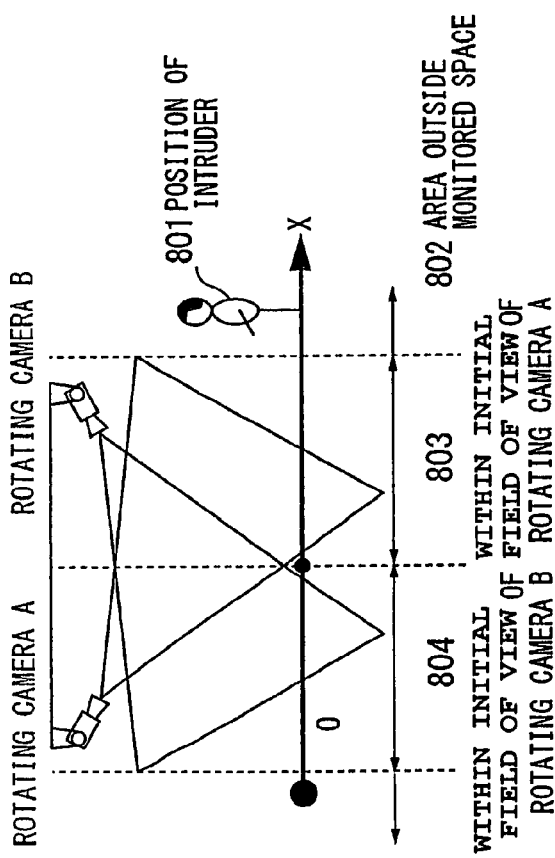
Figure 10D:
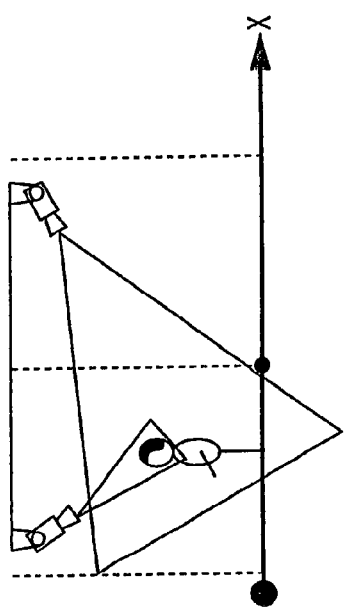

Similarly, referring to FIG. 10(c) showing a state in which the intruder 801 has moved and invaded into a field of view 804 of the rotating camera B in the initial shooting state, the rotating camera B catches the intruder 801, sends his or her image to the image processing device 103, which enables the rotating camera A to shoot an enlarged image of the watcher by sending a control signal to the rotating camera A. Referring to FIG. 10(d) showing a state in which the intruder 801 has moved out of the monitored space, since no intruding object is detected, the image processing device 103 sends control signals to the rotating cameras A and B again to detect any intruding object, and shifts them to the initial shooting state.

By switching in this way the functions of the cameras according to the position of the intruding object, each other's blind spot can be covered to kept track, and take an enlarged shot, of the intruding object.

While the function of each camera is determined in this embodiment of the invention according to the position in which the intruding object is detected, it is also conceivable to use a known image processing technique, such as an optical flow method, or to figure out the moving direction of the intruding object by combined use of infrared rays, magnetic sensors and the like, and determine the function of each camera according to the moving direction to enable the multiple-cameras to function in coordination.

Figure 11:
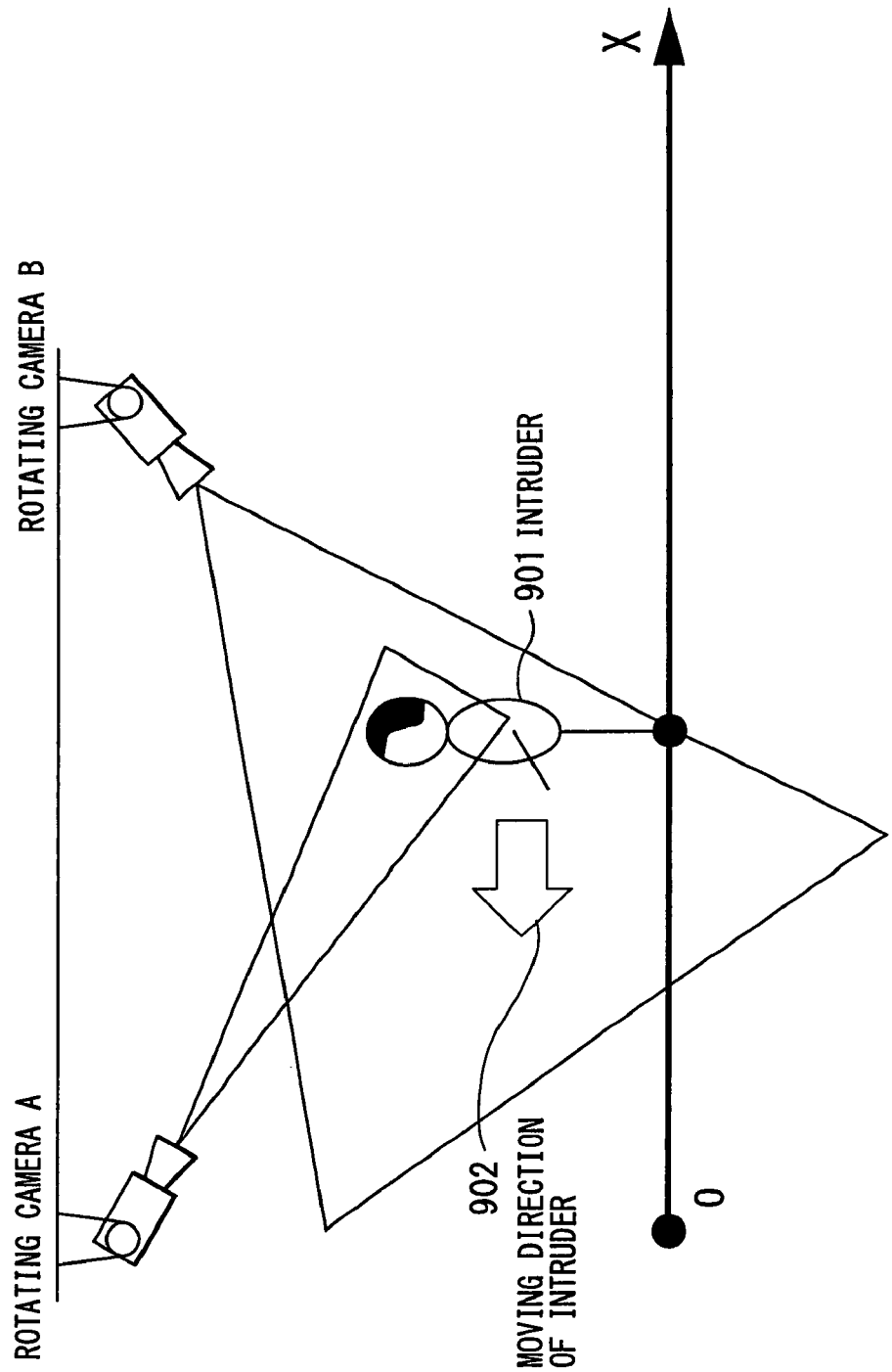
FIG. 11 illustrates a case in which the camera function determining section determines camera functions to enable the front face of the intruder to be displayed in the first embodiment of the invention.

For instance as shown in FIG. 11, based on an assumption that the intruder is moving in the same direction as his or her face is directed, it is made possible to decide from the moving direction 902 of an intruder 901 and to display the intruder's front face by allocating the tracking/shooting function to the rotating camera A and the function of wide angle shooting of the vicinity of the intruder to the rotating camera B. Similarly, it is also conceivable to recognize the orientation in which the intruding object is headed by combined use of image processing and various sensors, determine the function of each camera according to the orientation in which the intruding object is headed, and operate the multiple-cameras in coordination.

Further, although one of the two camera is assigned the function to keep track of the intruding object and the other is assigned the function to shoot the vicinity of the intruding object in a wide angle, these functions can be similarly allocated where more than two cameras are installed, and accordingly the number of surveillance cameras is not limited to two.

Also, where more than two cameras are to be installed, each of the aforementioned functions need not be allocated to only one camera, but multiple-cameras may be assigned the function to keep track of the intruding object at the same time, or the function to extensively monitor the vicinity of the intruding object at the same time. By having multiple-cameras to keep track of the intruding object at the same time, there will be provided a new advantage of making possible more detailed imaging of the intruding object. Furthermore, by having multiple-cameras to shoot the vicinity of the intruding object in a wide angle at the same time, there will be provided another new advantage of making possible more accurate computation of the position, moving direction and orientation of the intruding object.

Also, the functions of the cameras can be determined according to not only the detected position of the intruding object but also the state of each rotating camera to operate the cameras in coordination. For instance, where the effective field of view of each rotating camera is known and one of the rotating cameras is in trouble, the role of the rotating camera in trouble can be taken over by another by having the camera function determining means select the most suitable one of the untroubled rotating cameras and allocating the required role to that rotating camera.

Similarly, the functions of the cameras can be determined according to not only the detected position of the intruding object but also information on anything intercepting the field of view of any camera, such as an obstacle present in the monitored space to operate the cameras in coordination. For instance, it is made possible to track/shoot the intruding object and shoot the monitored area in a wide angle without fail by having the camera function determining means identify in advance the position and size of any obstacle present in the monitored space and forbidding it from allocating to the camera prevented by the obstacle from shooting the intruding object either the function to track/shoot the intruding object and that for wide angle shooting.

Also, though this embodiment identifies the position of the intruding object by subjecting to image processing the image signals sent from cameras, the cameras can be enabled to operate in coordination and display the intruding object in an enlarged image by identifying its position by combined use of infrared rays and magnetic sensors.

Embodiment 2

Figure 12:
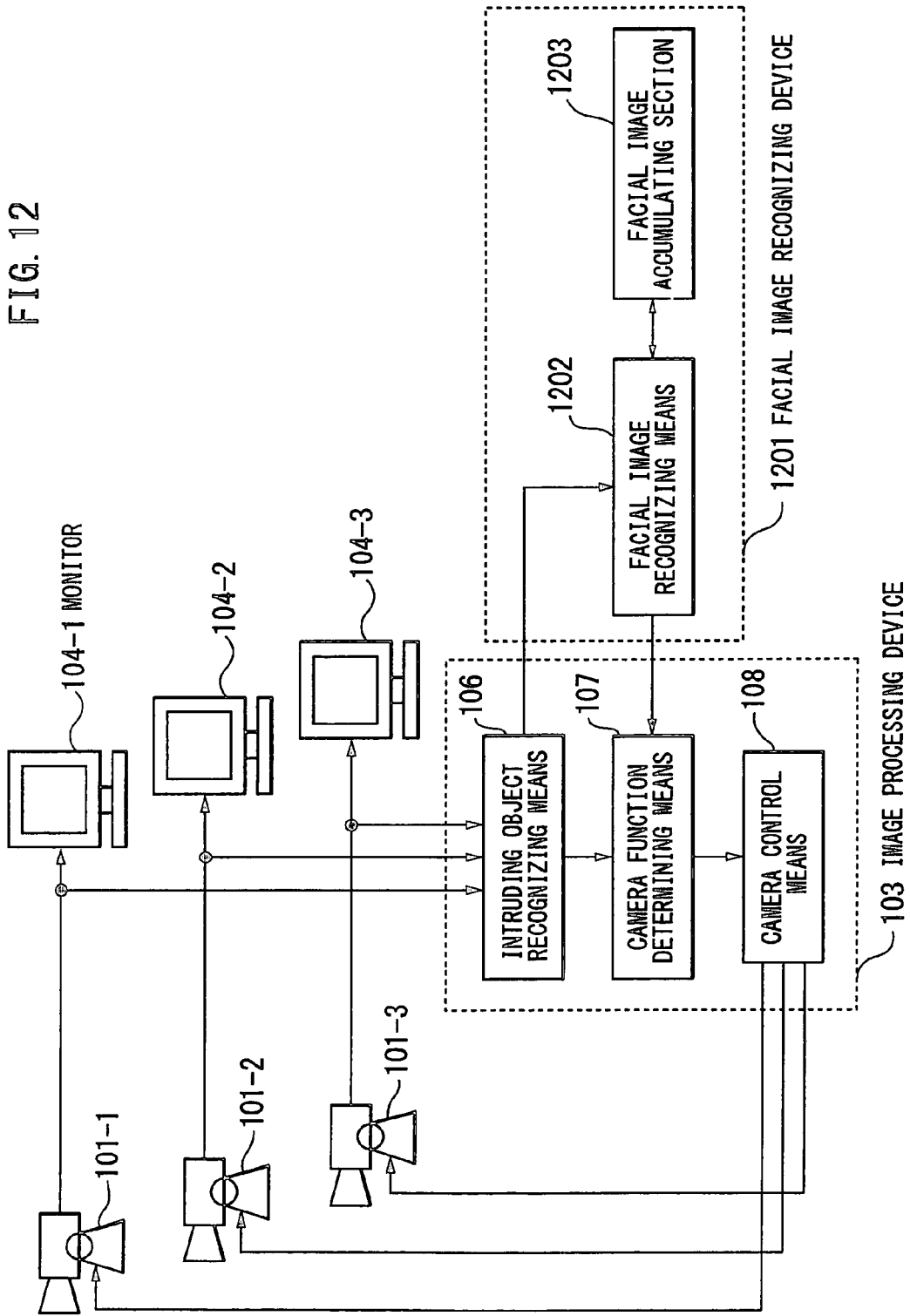
FIG. 12 is a block diagram of the configuration of a surveillance system, which is a second preferred embodiment of the invention.

FIG. 12 is a block diagram of the configuration of a surveillance system, which is a second preferred embodiment of the invention. In FIG. 12, the same constituent elements as in FIG. 3 will be denoted by respectively the same reference signs, and their description dispensed with. A characteristic feature of this embodiment consists in that photographic monitoring, the function control it and a facial image recognizing device as image recognizing means are combined with one another and, by allocating a function to each rotating camera according to the result of recognition, the camera function can be switched in a way suitable for facial image recognition and the performance of facial image recognition is thereby improved.

In FIG. 12, reference numeral 1201 denotes a facial image recognizing device for recognizing the image of a human face as image recognizing means, and this device comprises facial image recognizing means 1202 for singling out a specific face out of facial images and facial image accumulating means 1203 in which facial images are accumulated.

The intruding object recognizing means 106 identifies the three-dimensional coordinates of the intruding object, and further computes its moving direction by using past coordinates. It also transmits to the facial image recognizing means 1202 image signals from a camera to which the tracking function is allocated and the proper number of the camera. The facial image accumulating means 1203 holds in advance facial image data on objects of recognition, such as suspicious persons, photographed in various directions within a range in which facial image recognition is possible.

The facial image recognizing means 1202 receives from the intruding object recognizing means 106 image signals and the proper number of the camera, and compares the received image signals with the facial image data held by the facial image accumulating means 1203.

The facial image recognizing actions include, first as pretreatment, extraction of the face area from the received image signals by using a genetic algorithm in image processing techniques in C Language. This technique is described in, for instance, Takeshi Agui and Tomoharu Nagao, Introduction to Image Processing using programming language C, SHOKODO CO., LTD., 2000, pp. 187-211 (in Japanese). Next, coefficients of correlation between images in the extracted face area and various facial image data in the facial image accumulating means 1203 are figured out, and images having the maximum and minimum coefficients of correlation in the face area and facial image data in the facial image accumulating section 1203 are memorized. Finally, the maximum coefficient of correlation and a threshold TH1 are compared and, if it is not below the threshold, an alarm is issued by displaying the memorized images in the face area and facial image data in the facial image accumulating section 1203 arranged on monitors 104-1, 104-2 and 104-3. The maximum coefficient of correlation is also transmitted to the camera function determining means 107 as the degree of similarity.

The camera function determining means 107 determines camera function switching among cameras 101-1, 101-2 and 101-3 by using the three-dimensional coordinates and the moving direction of the intruding object transmitted from the intruding object recognizing means 106 and the similarity of facial image data transmitted from the facial image recognizing means 1202. Next will be described the camera function switching with reference to FIG. 13 and FIG. 14.

FIG. 13 is a diagram outlining the actions of the cameras 101-1 through 101-3 when an intruder invades in the direction reverse to that of the X axis. In FIG. 13, (a) shows a state in which no intruder is present in the monitored area, and (b) and (c) show states in which an intruder is in the positions of 1301(b) through 1301(c). FIG. 13(d) shows the state of the cameras immediately after the camera functions are switched from the state of FIG. 13(c). For instance, 1302(b)-1 through 1302(b)-3 show the field of views of the cameras 101-1, 101-2 and 101-3 in the state of FIG. 13(b); 1302(b)-1 and 1302(b)-3 where the field of view is wide are in a state of being assigned the wide angle shooting function, while 1302(b)-2 where the field of view is narrow and the face of an intruder 1301 is to be shot is in a state of being assigned the tracking/shooting function.

Figure 13A:
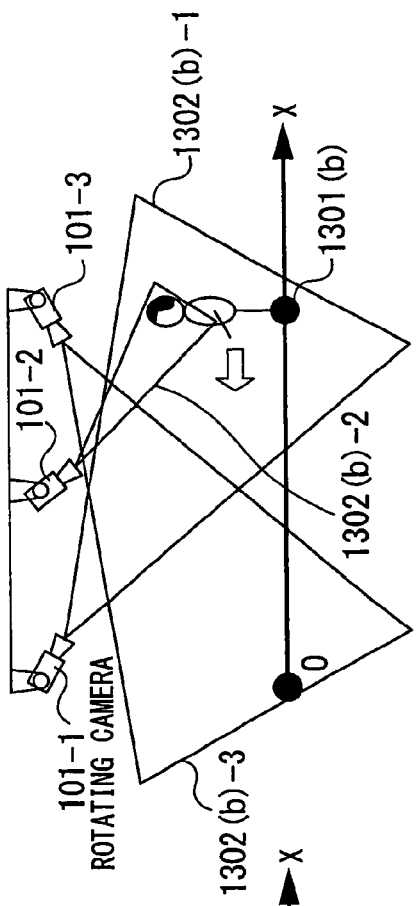
FIG. 13 illustrates the functions of cameras in the second preferred embodiment of the invention.
Figure 14:
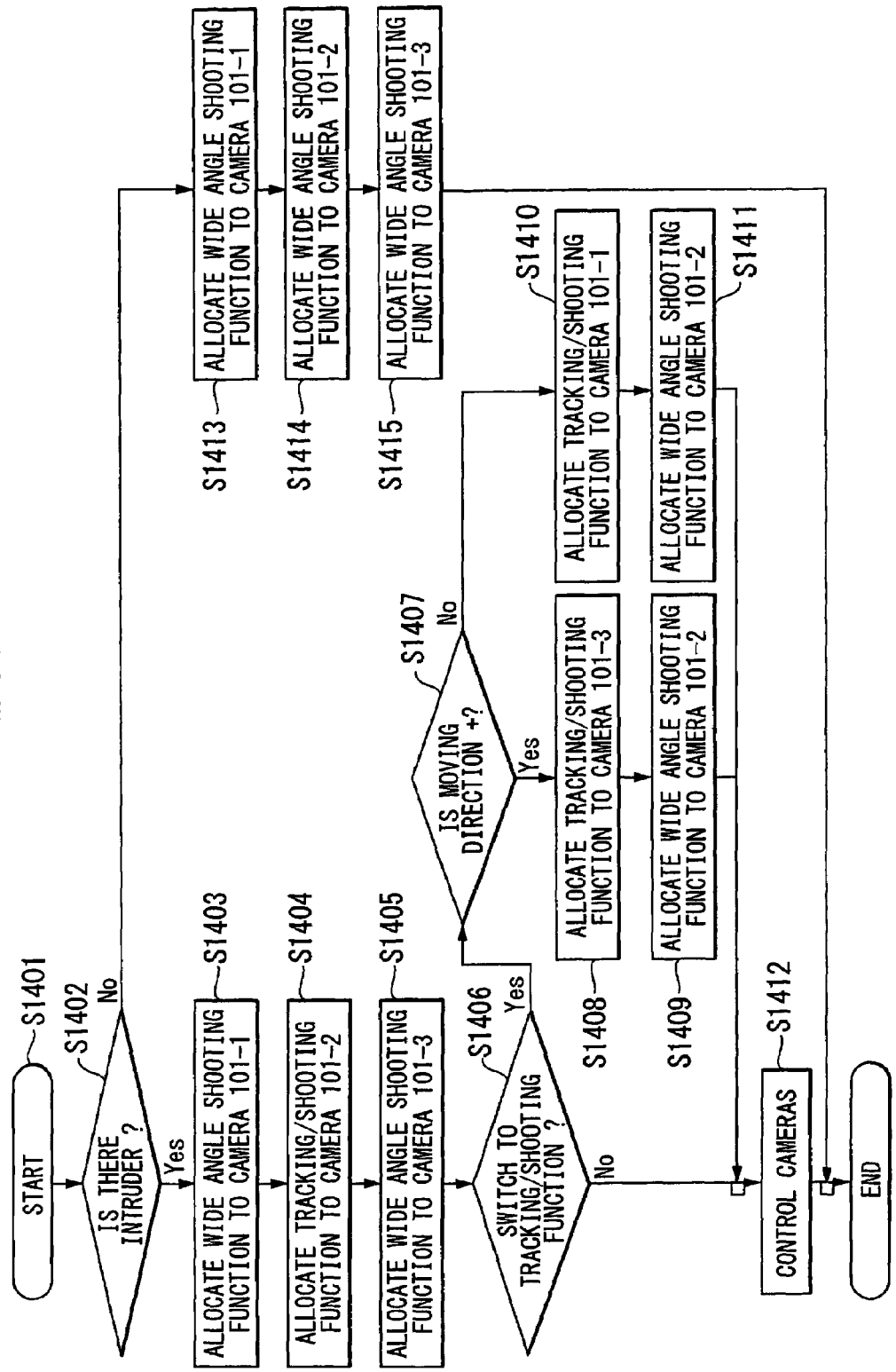
FIG. 14 is a flowchart of the sequence of processing to determine the functions of cameras in the second embodiment of the invention.

FIG. 14 is a flowchart showing the operation of the camera function determining means in the second embodiment of the invention. Referring to FIG. 14, when processing is started (step S1401), the camera function determining means 107 decides from the three-dimensional coordinates of the intruding object whether or not there is any intruder (step S1402) and, in the case of FIG. 13(a) where no intruder is present, allocates the wide angle shooting function to the camera 101-1 (step S1413); then allocates the wide angle shooting function to the camera 101-2 (step S1414); and further allocates the wide angle shooting function to the camera 101-3 (step S1415), followed by ending of the processing. On the other hand, in the presence of any intruder, the camera function determining means 107 allocates the wide angle shooting function to the camera 101-1 (step S1403); allocates the tracking/shooting function to the camera 101-2, whose switching from the wide angle shooting function to the tracking/shooting function hardly affects the intruding object recognizing means because, as shown in FIG. 13(a), its field of view greatly overlaps those of other cameras (step S1404); and allocates the wide angle shooting function to the camera 101-3 (step S1405). Next, the camera function determining means 107 makes at step S1406 a switching decision as to whether or not the tracking/shooting function if the camera 101-2 is to be allocated to another camera. The switching decision in this case is made by determining whether or not the similarity of facial image data computed from the image signals picked up by the camera 101-2 and transmitted by the facial image recognizing means 1202 surpasses a threshold TH2 within a certain length of time. If in this switching decision the similarity does not surpass the threshold TH2, the camera function determining means 107 will decide that the tracking/shooting function of the camera 101-2 is not working adequately in facial image recognition, and go ahead to step S1407 to allocate the tracking/shooting function to some other camera. On the other hand, if the similarity does surpass the threshold TH2, the camera function determining means 107 will decide that the tracking/shooting function of the camera 101-2 is working adequately in facial image, and go ahead to step S1412.

Figure 13B:
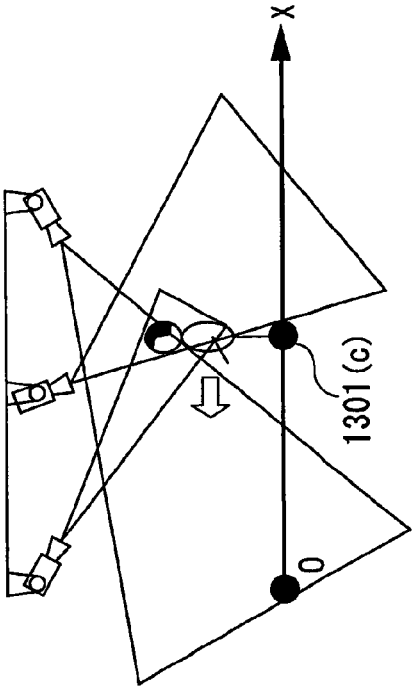
Figure 13C:
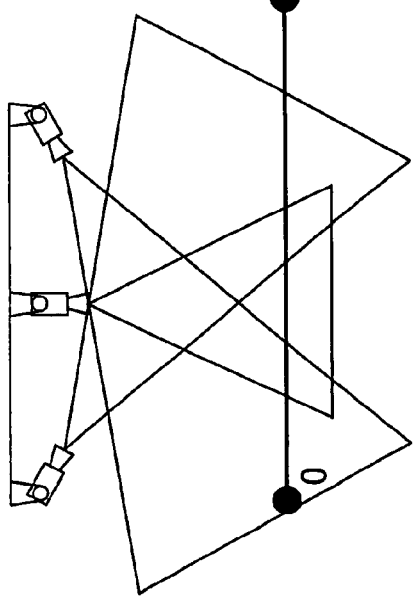

If, for instance, there is an intruder at 1301(b) in FIG. 13(b), the camera 101-2 can shoot the whole face of the intruder, and the similarity, which is the result of facial image recognition, shows a high level. Therefore in this case the processing goes ahead to step S1412. On the other hand, if there is any intruder in the position of 1301(c) as shown in FIG. 13(c), since the camera 101-2 shoots the intruder in a looking-down position from right above, it cannot pick up clues to facial image recognition such as the eyes, nose, eyebrows and mouth, resulting in a low level of similarity. Therefore, the processing goes ahead to step S1407 in this case.

If a tracking/shooting function switching decision is to be made as a result of the processing of switching decision at step S1406, the camera function determining section 107 will compare at step S1407 the moving direction of the intruding object transmitted from the intruding object recognizing means 106 with the direction of the X axis and decide whether or not they are the same. If the moving direction of the intruding object transmitted from the intruding object recognizing means 106 and the direction of the X axis are found the same (+ in FIG. 14), the tracking/shooting function will be allocated to the camera 101-3 (step S1408) while the wide angle shooting function is allocated to the camera 101-2 (step S1409), followed by going ahead to step S1412. Or if the moving direction of the intruding object transmitted from the intruding object recognizing means 106 and the direction of the X axis are found different, the tracking/shooting function will be allocated to the camera 101-1 (step S1410) while the wide angle shooting function is allocated to the camera 101-2 (step S1411), followed by going ahead to step S1412.

Figure 13D:
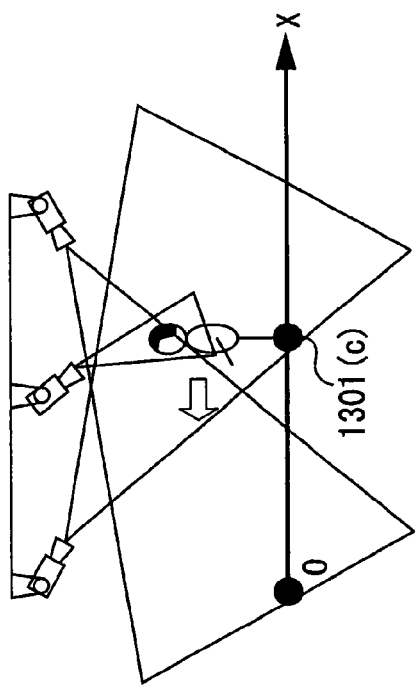

This provides the benefit of enabling a front facial image including the eyes and mouth to be shot and thereby enhancing the rate of facial image recognition by supposing that the moving direction of the intruder and the direction in which the intruder's face is positioned then are the same and allocating the tracking/shooting function to a camera capable of shooting the intruder in the direction reverse to his or her moving direction (i.e. in a state in which the camera is facing the intruder head on). As the position previously covered by the camera to which the tracking/shooting function is now allocated becomes a blind spot, the blind spot is covered by allocating the wide angle shooting function to the camera 101-2 as shown in FIG. 13(d).

Next at step S1412, the camera control means 108 references the three-dimensional positional coordinates of the intruding object transmitted from the camera function determining section 107 and the functions respectively allocated to the cameras 101-1, 101-2 and 101-3, and generates a control signal for each camera.

In this embodiment of the invention as described above, it is possible to allocate the tracking/shooting function to a camera suitable for facial image recognition by having the camera function determining section 107 receive information on the similarity of facial image data, which is the result of recognition by the facial image recognizing means 1202, and this is effective for walk-through verification, by which the face of a walking intruder can be verified.

To add, although this embodiment has been described with reference to a case in which a facial image recognizing device is used, it is also possible to utilize the result of recognition of the face area, which is pretreatment. It is also possible to realize switching between camera functions suitable for different modes of recognition and thereby to enhance the recognition performance by using the result of not only face recognition but also recognition achieved by a combination of means, each for recognizing a specific type of object, including personal recognizing means for identifying humans each in its totality and automobile recognizing means for identifying automobiles. In none of these cases, there is no limitation to this particular embodiment of the invention.

Although in this embodiment the tracking/shooting function is allocated to the camera 101-2 after recognizing an intruder as at step S1401 of FIG. 14, the invention is not limited to this embodiment. For instance, instead of choosing a camera near the position of the intruder and shooting him or her in a looking-down position from right above, the tracking/shooting function can as well be assigned to the camera farthest from the position of the intruder on the extension of his or her moving direction so that a camera from the position of the intruder is chosen and the profile to the front view of the intruder can be picked up.

Similarly, the accuracy of recognizing the position and moving direction of the intruder can be enhanced by allocating the wide angle shooting function to a camera near the position of the intruder, and this is not limited to this embodiment either.

Further, though in this embodiment the position and moving direction of the intruding object and the result of facial image recognition are used in determining the function of each camera, it is acceptable to use only the result of facial image recognition. For instance by successively switching the way of allocating camera functions until the best recognition result is achieved, it is possible to automatically detect the means of switching camera functions providing the best recognition result. It is also possible to reduce the length of time spent in searching for the means of switching camera functions providing the best recognition result in another state by learning the process of allocating functions to cameras.

It is also conceivable to allocate camera functions by using not only the position and moving direction of the intruding object and the result of recognition but also some other information. For instance by combining them with information of a position detecting sensor or a temperature sensor embedded in the floor, the position and invading direction of the intruder can be recognized more accurately, and the allocation of the most suitable camera function for facial image recognition can be accurately selected according to the result of recognition. For instance by deciding whether or not the moving direction and the direction of the face are the same according to the processing of information from a temperature sensor, allocation of camera functions which allows facial image recognition even of a suspicious person who is walking backward, i.e. whose face is headed in the direction reverse to the moving direction, can be realized.

Further, though this embodiment has been described with reference to camera functions, of which one is the tracking/shooting function by which the object of monitoring is shot on an enlarged scale according to the position of the object of monitoring, and the other is the wide angle shooting function by which the monitored space is shot in a wide angle to recognize the position of the object of monitoring, it is also possible to allocate other functions. For instance, it is also conceivable to allocate a mobile tracking/shooting function for a single camera, by which the result of motion detection is fed back to camera control and the moving object is kept caught at the center of the screen all the time. None of these is limited to this embodiment of the invention.

While the present invention has been hitherto described with reference to preferred embodiments thereof, obviously the invention is not limited to these embodiments. Obviously, persons skilled in the art can readily modify or alter the embodiments without deviating from the true spirit and scope of the invention, which also covers all such modifications and alterations.

What is claimed is:

1. A surveillance system comprising:
    a plurality of cameras including at least two rotating cameras configured to perform a tracking/shooting function and a wide angle shooting function;
    intruding object recognizing means for identifying a coordinate information of an object of monitoring on a coordinate space by analyzing image signals entered from said cameras;
    camera function determining means, which when an information that there is an intruding object is obtained from said intruding object recognizing means, allocates, according to the coordinate information of an object of monitoring on a coordinate space, to a first camera said tracking/shooting function whose field of view is a predetermined direction of said object of monitoring and to a second camera a wide angle shooting function, and further, the camera function determining means, when an information that there is no intruding object is obtained from said intruding object recognizing means, allocates to a plurality of cameras a wide angle shooting function; and
    camera control means for controlling said plurality of cameras according to the allocation of functions by the camera function determining means.

2. The surveillance system according to claim 1, further provided with image accumulating means for accumulating images of the object of monitoring in advance and image recognizing means for comparing said accumulated images of the object of monitoring with an image of the object of monitoring entered from the first camera, wherein the camera function determining means allocate to a third camera a tracking function according to a result of comparison by said image recognizing means and the coordinate information of the object of monitoring on a coordinate space.

3. The surveillance system according to claim 1, wherein the camera function determining means choose a camera whose field of view is in the predetermined direction of the object of monitoring, and allocate a tracking/shooting function to the cameras in a preferential order with priority assigned to a camera nearest said object of monitoring.

4. The surveillance system according to claim 1, wherein the camera function determining means choose a camera whose field of view is in the predetermined direction of the object of monitoring, and allocate the tracking/shooting function to the cameras in a preferential order with priority assigned to a camera farthest from said object of monitoring.

5. The surveillance system according to claim 1, wherein the camera function determining means choose a camera whose field of view is in the predetermined direction of the object of monitoring, and allocate the wide angle shooting function to the cameras in a preferential order with priority assigned to the camera farthest from said object of monitoring.

6. The surveillance system according to claim 2, wherein the camera function determining means choose a camera whose field of view is in the predetermined direction of the object of monitoring, and allocate a tracking/shooting function to the cameras in a preferential order with priority assigned to a camera nearest said object of monitoring.

7. The surveillance system according to claim 2, wherein the camera function determining means choose a camera whose field of view is in the predetermined direction of the object of monitoring, and allocate the tracking/shooting function to the cameras in a preferential order with priority assigned to a camera farthest from said object of monitoring.

8. The surveillance system according to claim 2, wherein the camera function determining means choose a camera whose field of view is in the predetermined direction of the object of monitoring, and allocate the wide angle shooting function to the cameras in a preferential order with priority assigned to the camera farthest from said object of monitoring.

9. The surveillance system according to any one of claim 1-8, wherein the camera function determining means memorize states of the plurality of cameras, and allocate the tracking/shooting function or the wide angle shooting function to said plurality of cameras according to the states of said plurality of cameras and the coordinate information of the object of monitoring on a coordinate space.

10. The surveillance system according to claim 9, wherein the camera function determining means, when any camera is added or removed or any camera is in trouble, update memorized states of the plurality of cameras.

11. The surveillance system according to any one of claim 1-8, wherein the camera function determining means memorize a state of a monitored area, and allocate the tracking/shooting function or the wide angle shooting function to the cameras according to the state of said monitored area and the coordinate information of the object of monitoring on a coordinate space.

12. The surveillance system according to claim 11, wherein the camera function determining means, when any obstacle in the monitored area prevents shooting of the object of monitoring, update the memorized states of the plurality of cameras.

13. The surveillance system according to claim 2, wherein the image accumulating means hold in advance facial image data picked up in many different directions, and the image recognizing means compare said facial image data with a facial image of the object of monitoring entered from any camera.

* * * * *